(12) United States Patent
Murata et al.

(10) Patent No.: US 12,525,651 B2
(45) Date of Patent: Jan. 13, 2026

(54) RECTANGULAR SECONDARY BATTERY

(71) Applicant: PANASONIC CORPORATION, Osaka (JP)

(72) Inventors: Ichiro Murata, Hyogo (JP); Hiroaki Imanishi, Hyogo (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 902 days.

(21) Appl. No.: 17/626,753

(22) PCT Filed: Apr. 27, 2020

(86) PCT No.: PCT/JP2020/017978
§ 371 (c)(1),
(2) Date: Jan. 12, 2022

(87) PCT Pub. No.: WO2021/014705
PCT Pub. Date: Jan. 28, 2021

(65) Prior Publication Data
US 2022/0238908 A1    Jul. 28, 2022

(30) Foreign Application Priority Data
Jul. 22, 2019   (JP) .................... 2019-134855

(51) Int. Cl.
*H01M 50/548*   (2021.01)
*H01M 4/66*   (2006.01)
(Continued)

(52) U.S. Cl.
CPC ......... *H01M 10/058* (2013.01); *H01M 4/661* (2013.01); *H01M 10/0525* (2013.01);
(Continued)

(58) Field of Classification Search
CPC .......... H01M 10/058; H01M 10/0525; H01M 50/548; H01M 50/176; H01M 50/553; H01M 4/661; H01M 2220/20
See application file for complete search history.

(56) References Cited

U.S. PATENT DOCUMENTS

2014/0212741 A1*   7/2014   Kim .................. H01M 50/528
                                                          429/179
2016/0043380 A1*   2/2016   Wakimoto .......... H01M 50/578
                                                          429/181
2019/0140250 A1    5/2019   Wakimoto et al.

FOREIGN PATENT DOCUMENTS

CN   109768211 A    5/2019
JP   2013-105538 A    5/2013
(Continued)

OTHER PUBLICATIONS

Extended European Search Report issued in corresponding European Patent Application No. 20843219.5, dated Oct. 5, 2022.
(Continued)

*Primary Examiner* — Osei K Amponsah
(74) *Attorney, Agent, or Firm* — Rimon P.C.

(57) ABSTRACT

A rectangular secondary battery includes: an electrode body including a positive electrode plate and a negative electrode plate; a rectangular battery case having an opening and housing the electrode body; a sealing plate sealing the opening; a current collector connected to an edge of the positive electrode plate or the negative electrode plate at a longitudinal end of the sealing plate; and an external terminal located outside the sealing plate and connected to the current collector. The current collector is a block body with a thickness along a width of the sealing plate, and having a hole at an end closer to the sealing plate. The current
(Continued)

collector is connected to the external terminal with a connector interposed therebetween which is inserted into the hole.

7 Claims, 10 Drawing Sheets

(51) Int. Cl.
  *H01M 10/0525*  (2010.01)
  *H01M 10/058*  (2010.01)
  *H01M 50/176*  (2021.01)
  *H01M 50/553*  (2021.01)
(52) U.S. Cl.
  CPC ....... *H01M 50/176* (2021.01); *H01M 50/548* (2021.01); *H01M 50/553* (2021.01); *H01M 2220/20* (2013.01)

(56) References Cited

FOREIGN PATENT DOCUMENTS

| | | | |
|---|---|---|---|
| JP | 2013-222517 A | | 10/2013 |
| JP | 2018-137166 A | | 8/2018 |
| JP | 2018-147829 A | * | 9/2018 |

OTHER PUBLICATIONS

International Search Report issued in corresponding International Patent Application No. PCT/JP2020/017978, dated Aug. 4, 2020, with English translation.
European Office Action Report dated Apr. 8, 2024 issued in the corresponding European Patent Application No. 20843219.5.

* cited by examiner

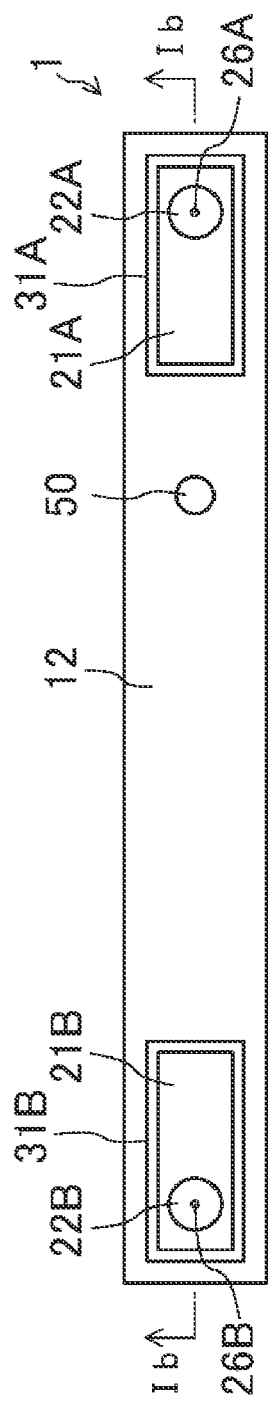
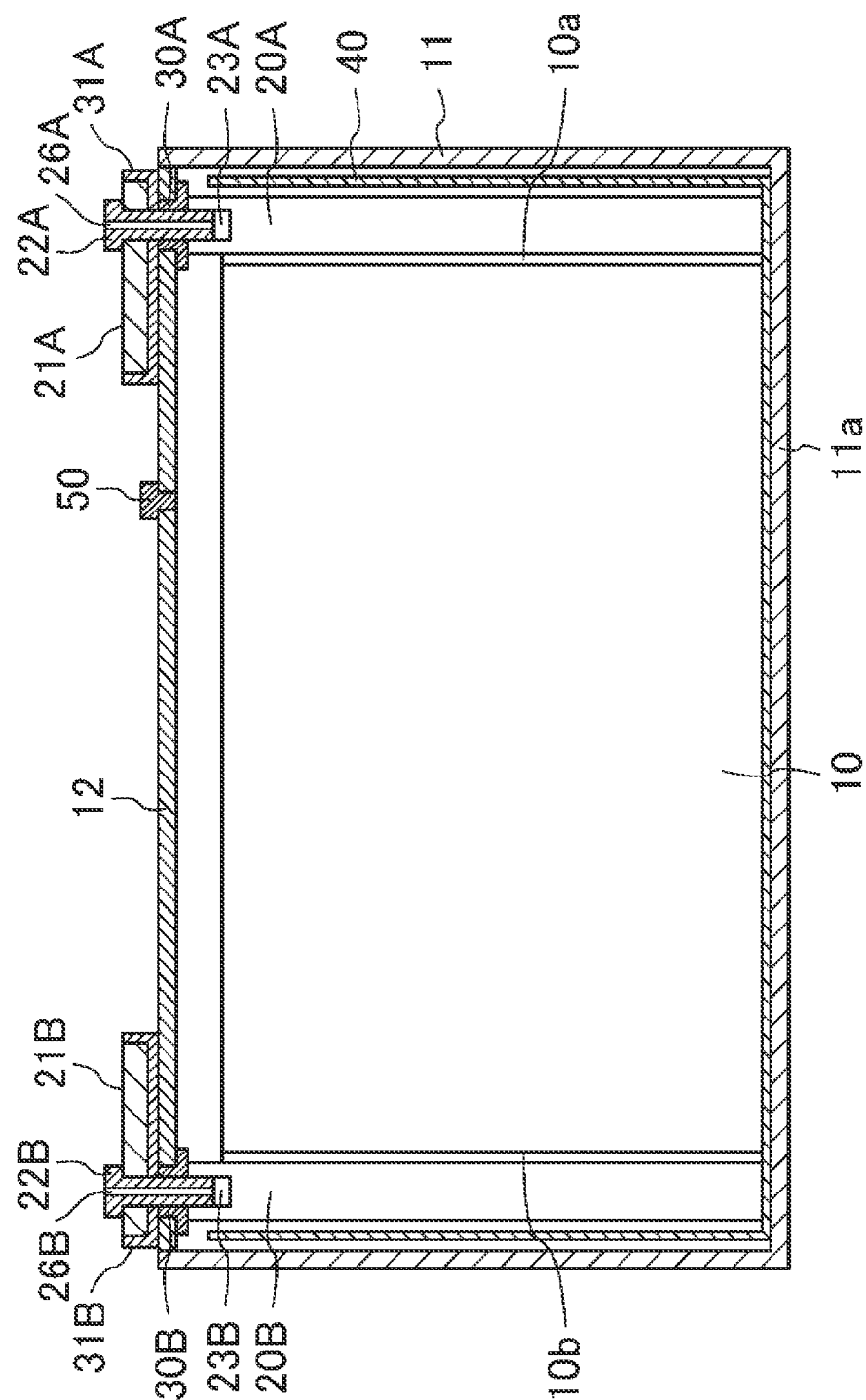

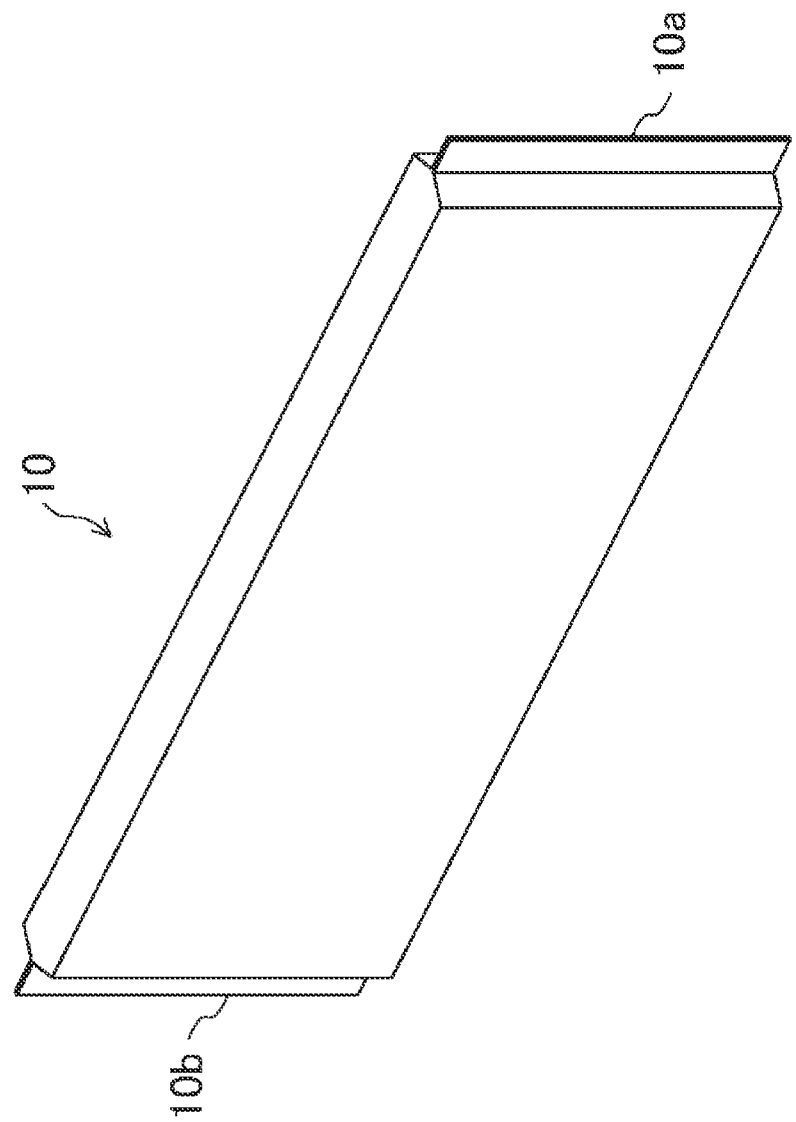
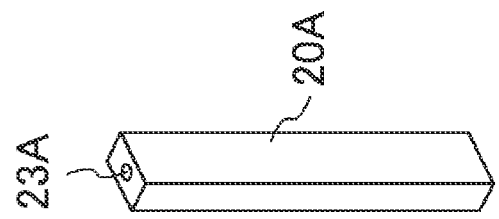
FIG.2A
FIG.2B

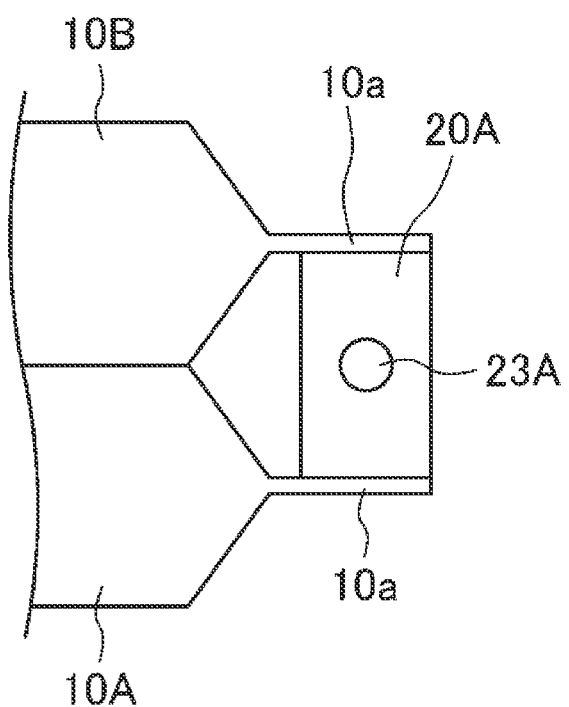

RECTANGULAR SECONDARY BATTERY

RELATED APPLICATIONS

This application is the U.S. National Phase under 35 U.S.C. § 371 of International Application No. PCT/JP2020/017978, filed on Apr. 27, 2020, which in turn claims the benefit of Japanese Application No. 2019-134855, filed on Jul. 22, 2019, the disclosures of which Applications are incorporated by reference herein.

TECHNICAL FIELD

The present invention relates to a rectangular secondary battery.

BACKGROUND ART

With a higher output of an on-vehicle secondary battery, a current flowing through the battery increases. As a result, an increasing amount of heat is generated in the battery, whereby the temperature of the entire battery rises. An excessive rise in the temperature of the entire battery may deteriorate resin parts such as a gasket and/or alter an electrolyte, for example.

Patent Document 1 discloses a sealed battery (e.g., a secondary battery) obtained by fastening a current collecting terminal (i.e., a current collector) to an external terminal by crimping a rivet. The current collecting terminal is connected to each of positive and negative electrodes of an electrode body.

CITATION LIST

Patent Document

Patent Document 1: Japanese Unexamined Patent Publication No. 2013-105538

SUMMARY OF THE INVENTION

In the secondary battery with the structure disclosed in Patent Document 1, the rivet needs to have a thickness reduced to some extent so as to be crimped. The rivet cannot have thus a large cross-sectional area. A large current flowing through the rivet may increase the Joule heat and cause an excessive temperature rise inside the battery.

In a lithium ion battery with a high energy density, a positive electrode current collector is typically made of aluminum or an aluminum alloy, and a negative electrode current collector is typically made of copper or a copper alloy. The rivet connected to each current collector is made of the same material as the current collector. That is, the rivet (e.g., aluminum) used for the positive electrode has a higher electrical resistance than the rivet (e.g., copper) used for the negative electrode. Accordingly, a large current flowing through the rivet for the positive electrode may increase the Joule heat and cause excessive temperature rise inside the battery.

The present invention was made in view of the foregoing. It is a main objective of the present invention to provide a secondary battery causing less Joule heat and less temperature rise inside.

A rectangular secondary battery according to the present invention includes: an electrode body including a positive electrode plate and a negative electrode plate; a rectangular battery case having an opening and housing the electrode body; a sealing plate sealing the opening; a current collector connected to an edge of the positive electrode plate or the negative electrode plate at a longitudinal end of the sealing plate; and an external terminal located outside the sealing plate and connected to the current collector, the current collector having a hole at an end closer to the sealing plate, and the current collector being connected to the external terminal with a connector interposed therebetween which is inserted into the hole.

The present invention provides a secondary battery causing less Joule heat and less temperature rise inside.

BRIEF DESCRIPTION OF THE DRAWINGS

FIG. 1A and FIG. 1B schematically show a configuration of a rectangular secondary battery according to an embodiment of the present invention. FIG. 1A is a top view, while FIG. 1B is a cross-sectional view taken along line Ib-Ib of FIG. 1A.

FIG. 2A and FIG. 2B illustrate a procedure of assembling the rectangular secondary battery according to the embodiment.

FIG. 4 illustrates the procedure of assembling the rectangular secondary battery according to the embodiment.

DESCRIPTION OF EMBODIMENTS

Figure 3:
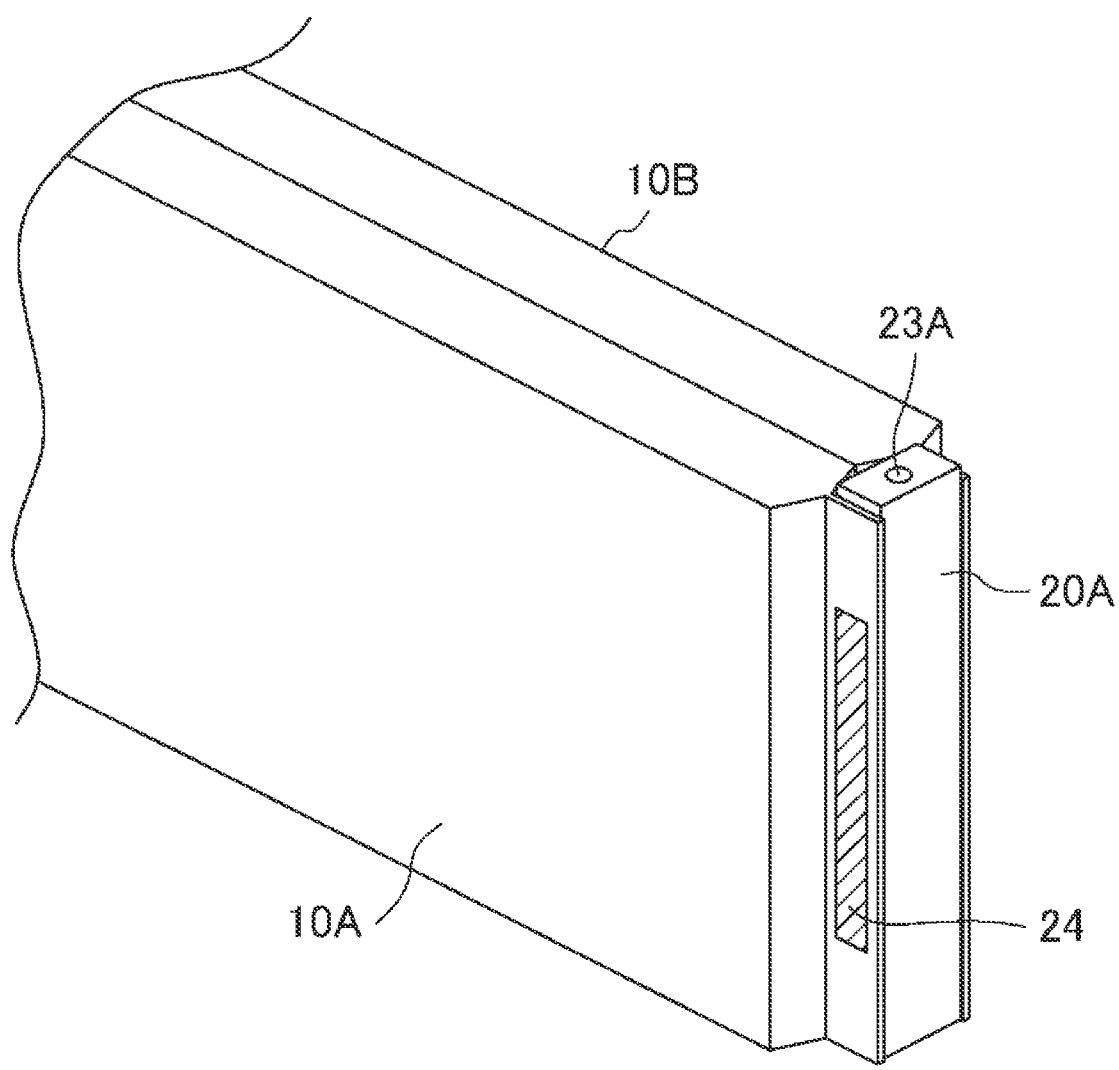
FIG. 3 illustrates the procedure of assembling the rectangular secondary battery according to the embodiment.

Embodiments of the present invention will be described in detail with reference to the drawings. Note that the present invention is not limited to the following embodiments. Modifications may be made as appropriate without departing from the scope of the advantages of the present invention.

FIG. 1A and FIG. 1B schematically show a configuration of a rectangular secondary battery according to an embodiment of the present invention. FIG. 1A is a top view, while FIG. 1B is a cross-sectional view taken along line Ib-Ib of FIG. 1A.

As shown in FIG. 1A and FIG. 1B, in a rectangular secondary battery 1 according to this embodiment, an electrode body 10, which is a power generation element, is housed together with an electrolyte in a rectangular battery case 11. The structure of the electrode body 10 is obtained by stacking a positive electrode plate and a negative electrode plate with a separator (none of them are shown) interposed therebetween. The positive electrode plate includes a positive electrode active material layer on the surface of a positive electrode core, while the negative electrode plate includes a negative electrode active material layer on the surface of a negative electrode core. The battery case 11 has an opening sealed with a sealing plate 12.

Each of the positive and negative electrode plates has exposures 10a and 10b, in which the active material layer is not formed, at the longitudinal ends of the sealing plate 12. The exposures 10a and 10b extend oppositely along the longitudinal direction of the sealing plate 12 and are connected to positive and negative current collectors 20A and 20B, respectively. Specifically, the plurality of exposures 10a and 10b are jointed to the current collectors 20A and 20B, respectively, while being bundled. The joining may be laser welding, for example.

The materials of the current collectors 20A and 20B are not particularly limited as long as being free from the influence of positive and negative electrode potentials in the electrolyte. The materials may be the same as the materials of the exposures 10a and 10b of the positive and negative electrode plates, respectively, in one preferred embodiment. For example, in the case of a lithium ion secondary battery, the (positive) current collector 20A connected to the exposure 10a of the positive electrode plate is made of aluminum or an aluminum alloy in one preferred embodiment. The (negative) current collector 20B connected to the exposure 10b of the negative electrode plate is made of copper or a copper alloy in one preferred embodiment.

The positive and negative current collectors 20A and 20B are block bodies with a thickness along the width of the sealing plate 12, and holes 23A and 23B at their ends closer to the sealing plate 12. Connectors 22A and 22B are respectively inserted into the holes 23A and 23B in the current collectors 20A and 20B.

The connectors 22A and 22B are formed of tubular bodies (e.g., cylindrical bodies) with flanges which are joined to external terminals 21A and 21B, respectively. Accordingly, the current collectors 20A and 20B are respectively connected to the positive and negative external terminals 21A and 21B with the connectors 22A and 22B interposed therebetween which are inserted into the holes 23A and 23B.

The connectors 22A and 22B are insulated from the sealing plate 12 by insulating members (i.e., gaskets) 30A and 30B, respectively. The external terminals 21A and 21B are insulated from the sealing plate 12 by insulating members 31A and 31B, respectively.

The electrode body 10 and the current collectors 20A and 20B are wrapped in an insulating holder 40 and housed in the battery case 11. The insulating holder 40 is in the shape of a bag open toward the sealing plate 12. The material of the insulating holder 40 is not particularly limited, and examples thereof include resin sheets such as polypropylene (PP) and polyethylene (PET).

Now, a procedure of assembling the rectangular secondary battery 1 according to this embodiment will be described with reference to FIGS. 2 to 6.

First, as shown in FIG. 2A and FIG. 2B, the electrode body 10 and the current collector 20A (or 20B) are prepared. As shown in FIG. 2A, the electrode body 10 has positive and negative exposures 10a and 10b at both the longitudinal ends of the sealing plate 12. As shown in FIG. 2B, the current collector 20A is a block body with a hole 23A, into which the connector 22A is inserted, at the end closer the sealing plate 12. The negative electrode current collector 20B has the same configuration. In the following description, the description of the current collector 20B will be omitted.

Next, as shown in FIG. 3 and FIG. 4, the two electrode bodies 10A and 10B with the same structure are arranged side by side along the width of the sealing plate 12. The exposures 10a and 10a of the electrode bodies 10A and 10B sandwich the current collector 20A. The exposures 10a and 10a and the current collector 20A are joined by laser welding, for example, in a joint area 24.

Figure 5A:
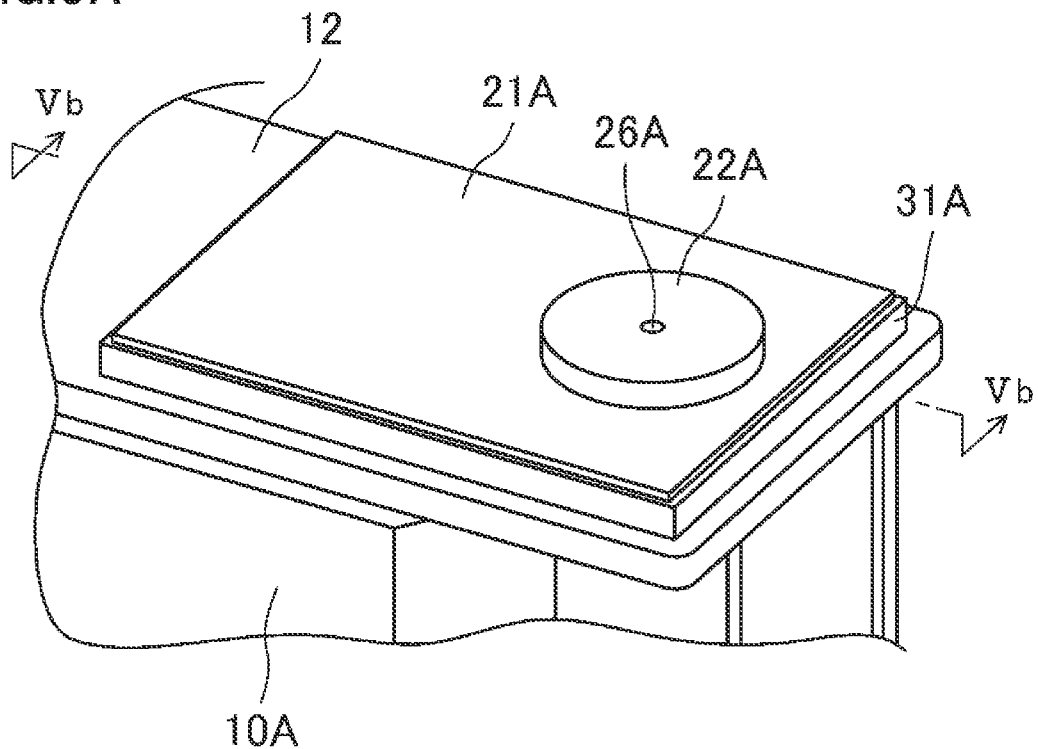
FIG. 5A and FIG. 5B illustrate the procedure of assembling the rectangular secondary battery according to the embodiment.
Figure 5B:
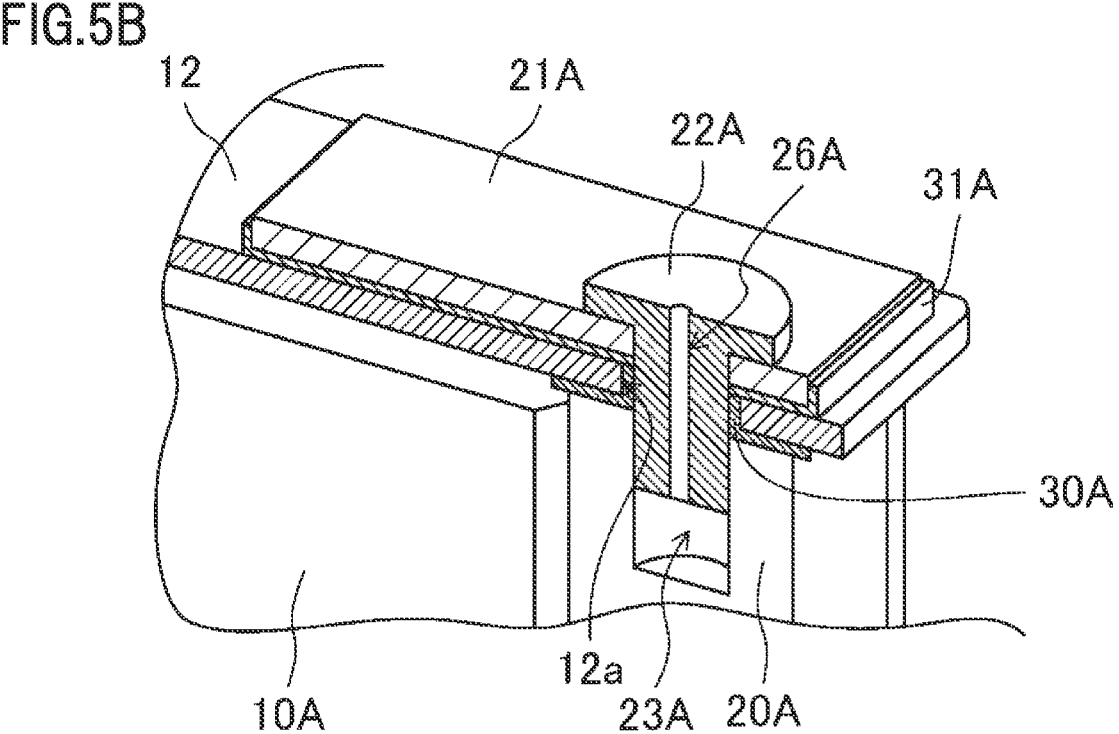

Next, as shown in FIG. 5A and FIG. 5B, the current collector 20A is fixed to the sealing plate 12 and the external terminal 21A. Here, FIG. 5A is an enlarged partial perspective view of portion around the sealing plate 12 of the current collector 20A. FIG. 5B is a partial cross-sectional view taken along line Vb-Vb of FIG. 5A.

As shown in FIG. 5A and FIG. 5B, the insulating member (i.e., the gasket) 30A, the sealing plate 12, the insulating member 31A, and the external terminal 21A are placed in this order on the current collector 20A. Each of the insulating member 30A, the sealing plate 12, the insulating member 31A, and the external terminal 21A has a through-hole in a corresponding position to the hole 23A of the current collector 20A. In addition, the insulating member 30A has an outer periphery abutting on the inner peripheral surface of a through-hole 12a in the sealing plate 12.

Then, the connector 22A passes through the through-holes in the insulating member 30A, the sealing plate 12, the insulating member 31A, and the external terminal 21A, and press-fitted into the hole 23A of the current collector 20A. Accordingly, the current collector 20A is fixed to the connector 22A more firmly. At this time, a compressed insulating member (i.e., gasket) 30A is interposed between the inner peripheral surface of the through-hole 12a in the sealing plate 12 and the outer peripheral surface of the connector 22A, and between the bottom surface of the sealing plate 12 and the upper surface of the current collector 20A.

After that, the flange of the connector 22A and the external terminal 21A are welded with laser, for example, to melt-bond the connector 22A and the external terminal 21A, which further reduces the electrical resistance.

When the connector 22A is press-fitted into the hole 23A, the space inside the hole 23A is gradually compressed. That is, the connector 22A gradually has difficulty in being press-fitted and may not reach a predetermined depth. In order to solve this problem, as shown in FIG. 5B, the connector 22A has a continuous hole 26A causing the hole 23A to communicate with the outside in one preferred embodiment. Accordingly, the connector 22A can be press-fitted to a predetermined depth of the hole 23A, while releasing the air inside the hole 23A through the continuous hole 26A to the outside.

Figure 6:
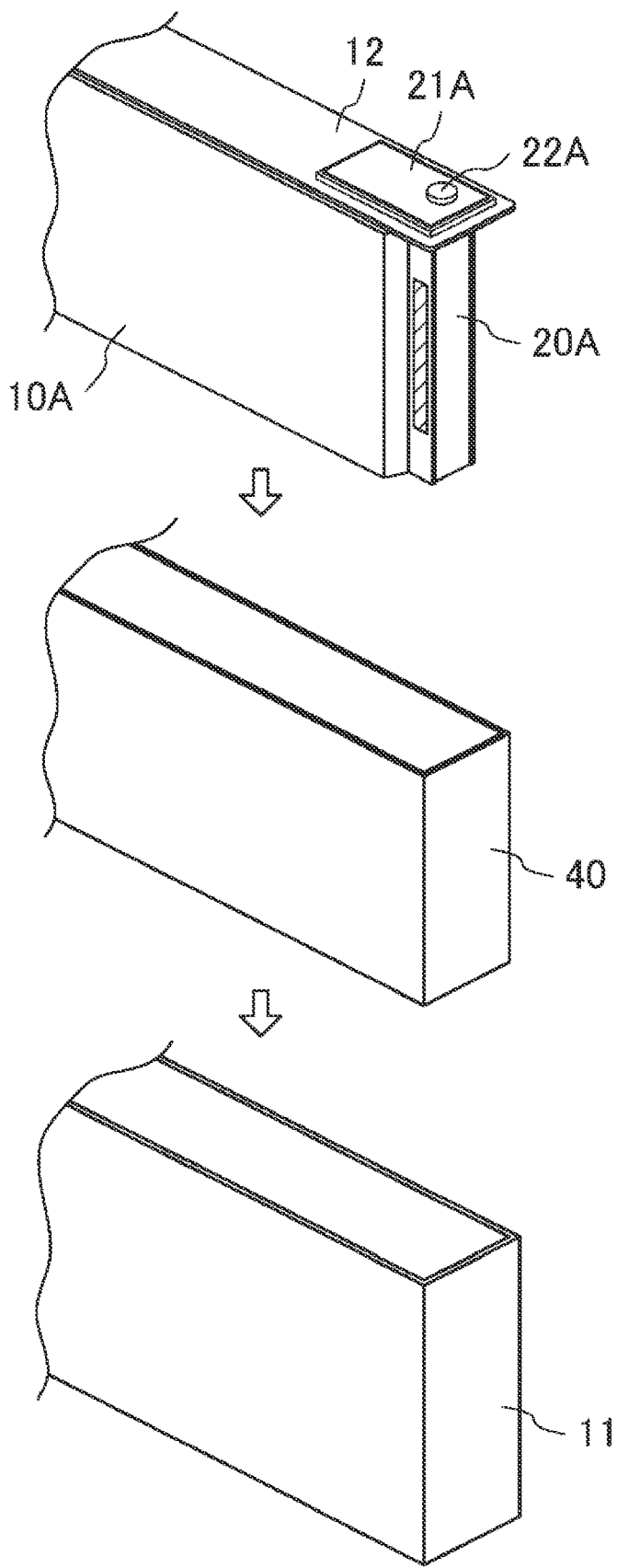
FIG. 6 illustrates the procedure of assembling the rectangular secondary battery according to the embodiment.

Next, as shown in FIG. 6, the sealing plate 12, to which the current collector 20A, the connector 22A, and the external terminal 21A are integrally fixed, is inserted into the insulating holder 40. The electrode body 10 and the current collector 20A wrapped in the insulating holder 40 are then housed in the battery case 11. After that, the end of the battery case 11 closer to the opening and the outer periphery of the sealing plate 12 are welded with laser, for example, to seal the battery case 11. At the end, an electrolyte is poured into the battery case 11 through a liquid inlet (not shown) in the sealing plate 12, and then the liquid inlet is closed with a plug 50 (see FIG. 1).

According to this embodiment, the connector 22A connecting the current collector 20A and the external terminal 21A is a tubular body, which provides a larger cross-sectional area for flowing a current than in typical fastening by crimping a rivet. Accordingly, the electrical resistance decreases at the connector 22A, which generates less Joule heat even when a large current flows through the connector 22A. This results in less temperature rise inside the battery.

In this embodiment, the two electrode bodies 10A and 10B are arranged side by side along the width of the sealing plate 12. As shown in FIG. 4, the exposures 10a and 10a of the electrode bodies 10A and 10B sandwich the current collector 20A to be jointed to the current collector 20A. The block body of the current collector 20A has thus a greater thickness along the width of the sealing plate 12. This increases the cross-sectional area of the current collector 20A and eventually the inner diameter of the hole 23A. As a result, the outer diameter of the connector 22A increases, which reduces temperature rise inside the battery more advantageously.

In this embodiment, portion of the (positive electrode) connector 22A connected to the positive electrode current collector 20A is located in the battery case 11 below the sealing plate 12. However, as shown in FIG. 5B, the compressed insulating member (i.e., gasket) 30A is interposed between the inner peripheral surface of the through-hole 12a in the sealing plate 12 and the outer peripheral surface of the connector 22A, and between the bottom surface of the sealing plate 12 and the upper surface of the current collector 20A. That is, the connector 22A press-fitted into the hole 23A of the current collector 20A is isolated from the space inside the battery case 11 by the insulating member (i.e., the gasket) 30A and the current collector 20A. The connector 22A does not come into contact with the electrolyte in the battery case 11 and is thus free from the influence of the electrolyte, even if the positive electrode connector 22A is made of copper or a copper alloy.

Accordingly, the positive electrode connector 22A is made of copper or a copper alloy instead of typically used aluminum or an aluminum alloy to further reduce the electrical resistance at the connector 22A. As a result, less Joule heat is generated even when a large current flows through the connector 22A, which further reduces temperature rise inside the battery. If the positive electrode connector 22A is made of copper or a copper alloy, the external terminal for the positive electrode (i.e., the positive electrode external terminal) 21A may also be made of copper or a copper alloy.

In this embodiment, the connector 22A is press-fitted into the hole 23A of the current collector 20A to fix the current collector 20A. This causes less contact resistance between the connector 22A and the current collector 20A than in typical fastening by crimping a rivet. Accordingly, less Joule heat is generated at the connector 22A, which further reduces temperature rise inside the battery.

While the present invention has been described with reference to a preferred embodiment, such description is not limiting, and various modifications may be made.

For example, while the connector 22A is the tubular body with the flange in the embodiment described above, the configuration is not limited thereto. The connector 22A may be a bolt, for example.

Figure 7A:
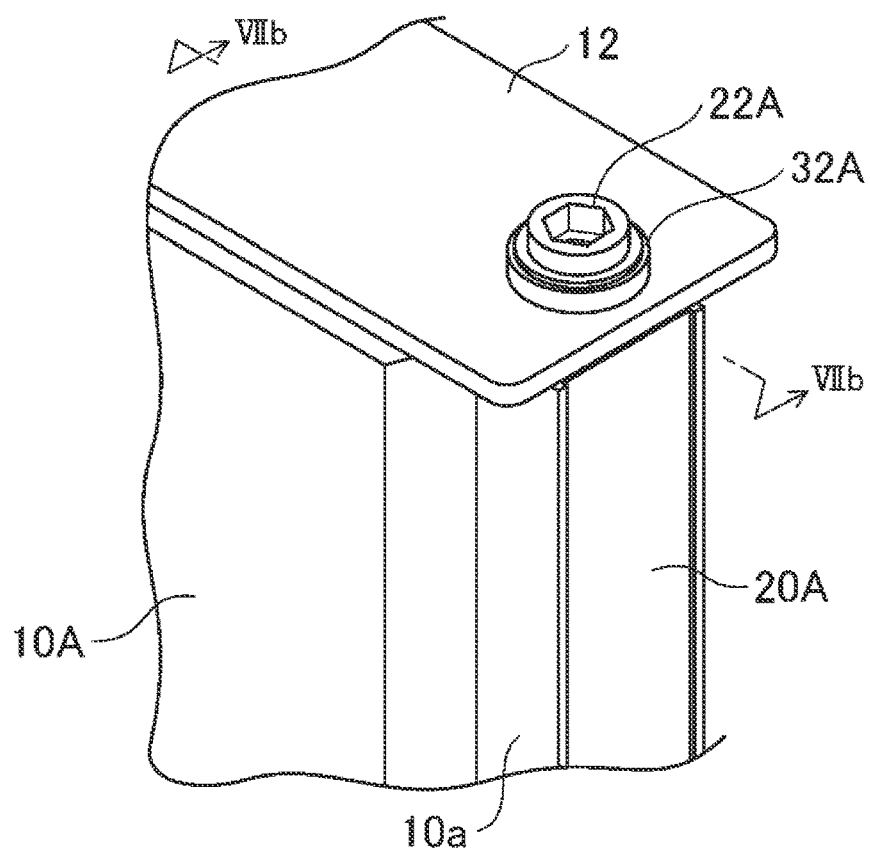
FIG. 7A and FIG. 7B illustrate a procedure of assembling a rectangular secondary battery according to another embodiment.
Figure 7B:
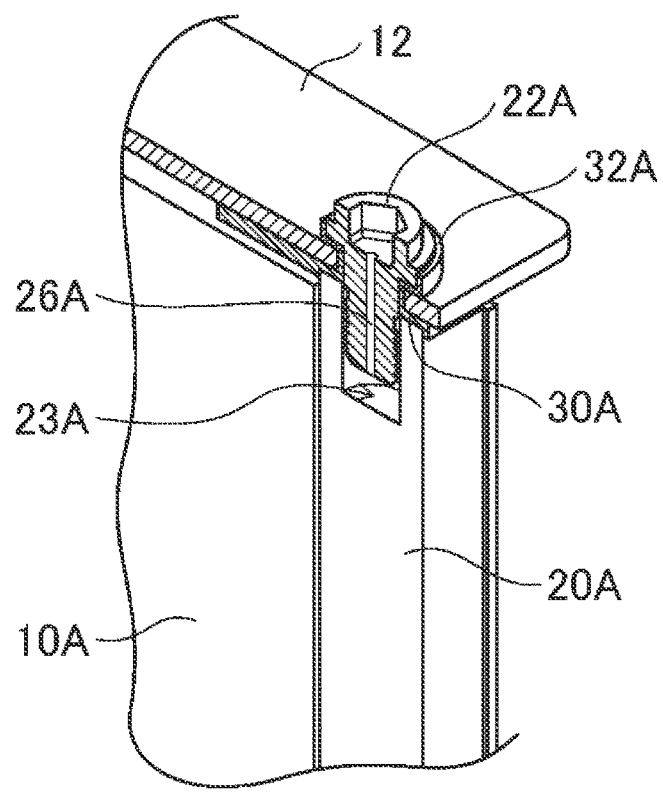
Figure 8A:
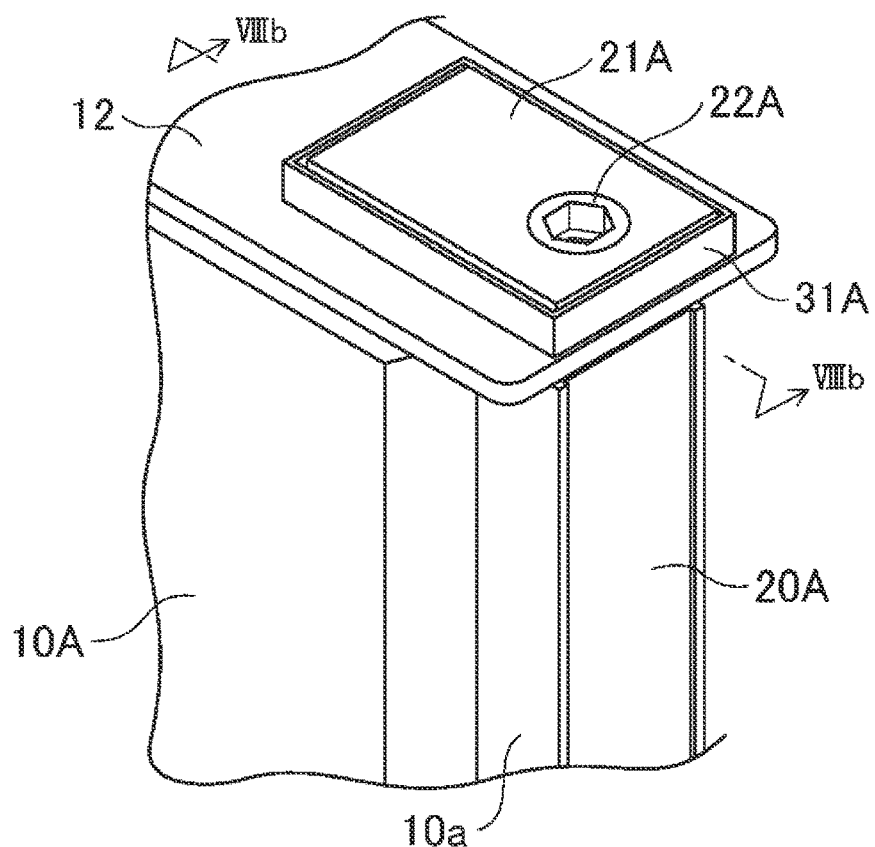
FIG. 8A and FIG. 8B illustrate the procedure of assembling the rectangular secondary battery according to the other embodiment.
Figure 8B:
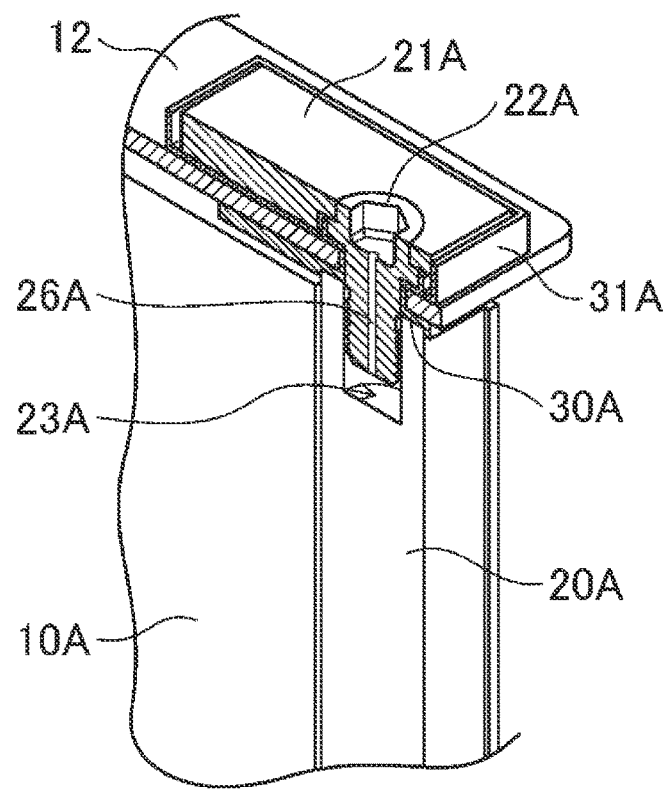

FIGS. 7A, 7B, 8A, and 8B illustrate an assembly procedure where the connector 22A is a bolt. Here, FIG. 7A is an enlarged partial perspective view of portion around the sealing plate 12 of the current collector 20A, while FIG. 7B is a partial cross-sectional view taken along line VIIb-VIIb of FIG. 7A. Here, FIG. 8A is an enlarged partial perspective view of portion around the sealing plate 12 of the current collector 20A, while FIG. 8B is a partial cross-sectional view taken along line VIIIb-VIIIb of FIG. 8A.

As shown in FIG. 7A and FIG. 7B, the insulating member (i.e., the gasket) 30A, the sealing plate 12, and an insulating member 32A are placed in this order on the current collector 20A. Each of the insulating member 30A, the sealing plate 12, and the insulating member 32A has a through-hole in a corresponding position to the hole 23A (with an internal thread) of the current collector 20A. In addition, the insulating member 30A has an outer periphery abutting on the inner peripheral surface of the through-hole in the sealing plate 12.

Next, the connector 22A passes through the through-holes in the sealing plate 12 and the insulating member 32A, and fastened with a bolt to the hole 23A (with the internal thread) of the current collector 20A. Accordingly, the current collector 20A and the insulating member 30A are fixed to the sealing plate 12 by the connector 22A. Note that the connector 22A may have a continuous hole 26A causing the space inside the hole 23A (with an internal thread) to communicate with the outside.

Next, as shown in FIG. 8A and FIG. 8B, the insulating member 31A and the external terminal 21A are placed on the sealing plate 12, and the flange of the connector 22A and the external terminal 21A are welded with laser, for example. Accordingly, the connector 22A and the external terminal 21A are melt-bonded, which further reduces the electrical resistance.

Even the connector 22A, which is a bolt, secures a larger cross-sectional area, through which a current flows, than in typical fastening by crimping with a rivet, which reduces the electrical resistance at the connector 22A. Accordingly, less Joule heat is generated even when a large current flows through the connector 22A, which reduces temperature rise inside the battery.

The connector 22A fastened to the hole 23A (with the internal thread) of the current collector 20A with the bolt is isolated from the space inside the battery case 11 by the insulating member (i.e., the gasket) 30A and the current collector 20A. The connector 22A does not come into contact with the electrolyte in the battery case 11 and is thus free from the influence of the electrolyte, even if the positive electrode connector 22A is made of copper or a copper alloy. Accordingly, the connector 22A is made of copper or a copper alloy to further reduce the electrical resistance at the connector 22A. As a result, less Joule heat is generated even when a large current flows through the connector 22A, which further reduces temperature rise inside the battery.

In the embodiment described above, the connector 22A and the external terminal 21A are separate components. Alternatively, the connector 22A and the external terminal 21A may be integrally formed into a single member. In addition, the connector 22A has a solid structure in one preferred embodiment, but may have a partially hollow structure.

In addition, in the embodiment described above, each electrode body is obtained by stacking the positive and negative electrode plates with the separator interposed therebetween. Alternatively, the positive and negative electrode plates may be wound with a separator interposed therebetween.

Figure 9:
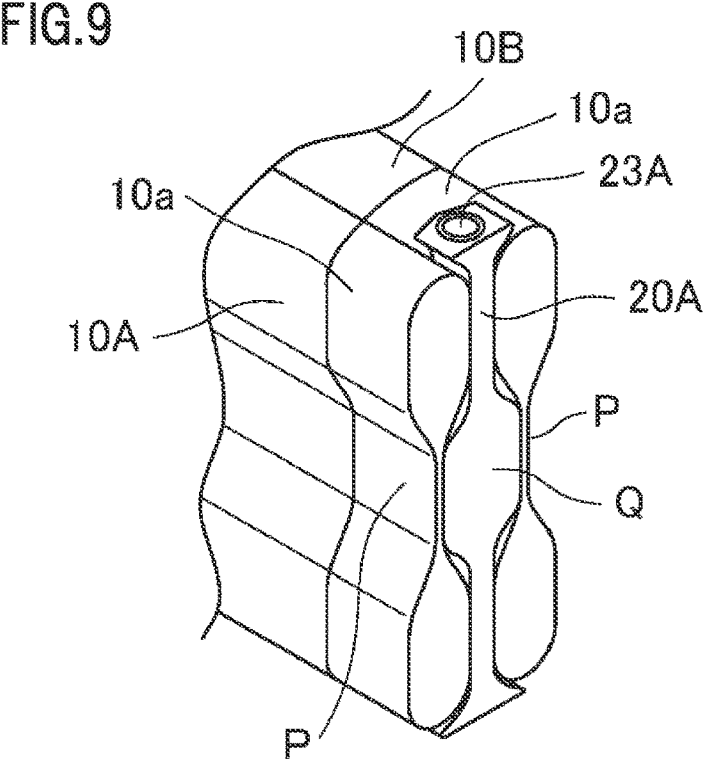
FIG. 9 is a partial schematic perspective view of a structure of the current collector for electrode bodies with a wound structure.

FIG. 9 is a partial perspective view schematically showing a structure of the current collector 20A for the electrode body 10A with the wound structure.

As shown in FIG. 9, the electrode bodies 10A and 10B have a plurality of exposures 10a at the longitudinal ends of the sealing plate 12 of wound electrode plates. Each of the exposures 10a is compressed at a middle area P in the height direction of the battery case 11, while being bundled.

On the other hand, the current collector 20A is placed while being sandwiched between the exposures 10a and 10a of the electrode bodies 10A and 10B. At this time, in a middle area Q in the height direction of the battery case 11, the current collector 20A has, along the width of the sealing plate 12, a width increasing toward the exposures 10a and 10a to come into contact with the exposures 10a and 10a. Accordingly, in the areas P and Q, the current collector 20A and the exposures 10a and 10a are joined by laser welding, for example.

Figure 10:
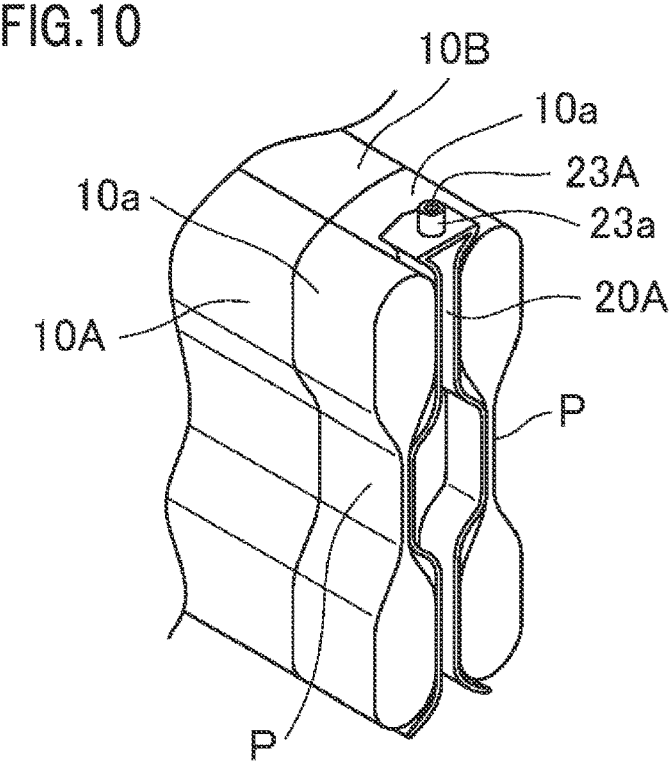
FIG. 10 is a partial schematic perspective view of another structure of the current collector for electrode bodies with a wound structure.

The current collector 20A has a solid structure in FIG. 9, but may have a hollow structure as shown in FIG. 10. In this case, the hole 23A, into which the connector 22A (22B) is inserted, may be made as follows. The current collector 20A may have, at the end closer to the sealing plate 12, a cylindrical part 23a with the hole 23A.

Figure 11:
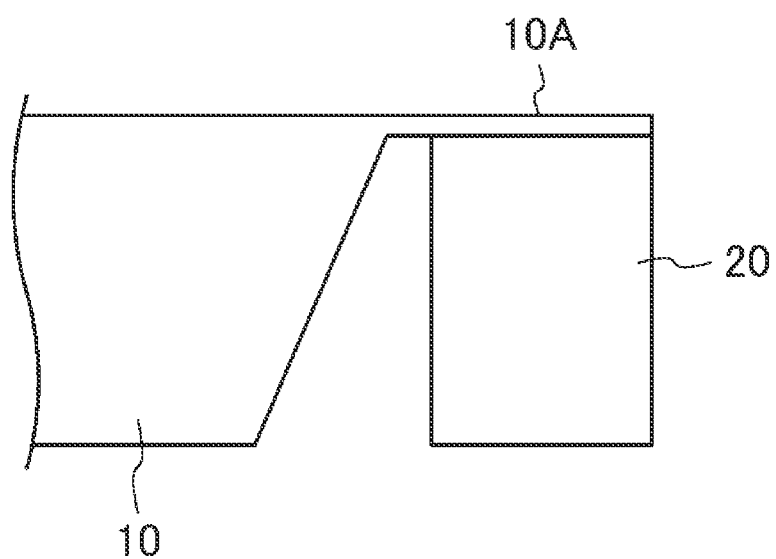
FIG. 11 is a partial cross-sectional view of a structure of the current collector for a single electrode body.

In the embodiment described above, the two electrode bodies 10A and 10B with the same structure are arranged in the battery case 11. Alternatively, a single electrode body may be placed. In this case, as shown in FIG. 11, the electrode body 10 has, at the longitudinal ends of the sealing plate 12, a plurality of exposures 10a which are bundled at the transverse ends of the sealing plate 12. Then, the exposures 10a and the current collector 20 may be joined by laser welding, for example, with the current collector 20 abutting on the exposures 10a.

In the embodiment described above, the current collectors 20A and 20B are connected to the exposures 10a and 10b at both edges of the positive and negative electrode plates, respectively. Alternatively, the current collector 20 may be connected to the exposures 10a and 10b of only one of the positive or negative electrode plate.

The type of the rectangular secondary battery according to this embodiment is not particularly limited. For example, the rectangular secondary battery is applicable to a lithium ion secondary battery, a nickel hydrogen secondary battery, or other batteries.

DESCRIPTION OF REFERENCE CHARACTERS

1 Rectangular Secondary Battery
10, 10A, 10B Electrode Body
10a, 10b Exposure
11 Battery Case
12 Sealing Plate
12a Through-hole
20, 20A, 20B Current Collector
21A, 21B External Terminal
22A, 22B Connector
23A, 23B Hole
23a Cylindrical Part
24 Joint Area
26A, 26B Continuous Hole
30A, 30B Insulating Member (Gasket)
31A, 31B Insulating Member
32A Insulating Member
40 Insulating Holder
50 Plug

The invention claimed is:

1. A rectangular secondary battery comprising:
an electrode body including a positive electrode plate and a negative electrode plate;
a rectangular battery case having an opening and housing the electrode body;
a sealing plate sealing the opening;
a current collector connected to an edge of the positive electrode plate or the negative electrode plate at a longitudinal end of the sealing plate; and
an external terminal located outside the sealing plate and connected to the current collector, wherein:
the current collector is a block body with a thickness along a width of the sealing plate,
the block body has a hole with a bottom at an end closer to the sealing plate so that the hole does not go completely through the block body,
the current collector is connected to the external terminal with a connector interposed therebetween which is inserted into the hole, and
the connector is isolated from a space inside the battery case by the current collector.

2. The rectangular secondary battery of claim 1, wherein the connector is a tubular body with a flange,
the flange is joined to the external terminal, and
the connector is press-fitted into the hole.

3. The rectangular secondary battery of claim 1, wherein the connector has a continuous hole causing the hole to communicate with an outside.

4. The rectangular secondary battery of claim 1, wherein the sealing plate has a through-hole into which the connector is inserted, and
a compressed gasket is interposed between an inner peripheral surface of the through-hole and an outer peripheral surface of the connector, and between a bottom surface of the sealing plate and an upper surface of the current collector.

5. The rectangular secondary battery of claim 1, wherein a positive electrode current collector connected to the edge of the positive electrode plate is made of aluminum or an aluminum alloy, and
a positive electrode connector and a positive electrode external terminal that are connected to the positive electrode current collector are made of copper or a copper alloy.

6. The rectangular secondary battery of claim 1, wherein the electrode body includes a plurality of electrode bodies, and
an edge of the positive electrode plate or the negative electrode plate of each of the electrode bodies is connected to the current collector in common.

7. The rectangular secondary battery of claim 1, wherein the electrode body does not overlap the current collector seen from a direction in which the electrode body and the sealing plate are arranged.

* * * * *